(12) United States Patent
Manalis et al.

(10) Patent No.: US 6,307,202 B1
(45) Date of Patent: Oct. 23, 2001

(54) BIMORPH SPIRALS FOR UNCOOLED PHOTOTHERMAL SPECTROSCOPY

(75) Inventors: Scott R. Manalis, Santa Barbara, CA (US); Stephen C. Minne, Danville, IL (US); Calvin F. Quate, Stanford, CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 0 days.

(21) Appl. No.: 09/332,540

(22) Filed: Jun. 14, 1999

Related U.S. Application Data
(60) Provisional application No. 60/089,527, filed on Jun. 15, 1998.

(51) Int. Cl.[7] .................................................. G01J 5/10
(52) U.S. Cl. ................................................. 250/347
(58) Field of Search ............................... 359/565, 573; 250/347

(56) References Cited

U.S. PATENT DOCUMENTS

| | | | |
|---|---|---|---|
| 3,781,955 | * 1/1974 | Lavrinenko et al. | 29/25.35 |
| 4,355,898 | * 10/1982 | Dakin | 356/450 |

FOREIGN PATENT DOCUMENTS

07307500-A * 11/1995 (JP) ..................... H01L/41/22

OTHER PUBLICATIONS

P. I. Oden et al., Uncooled Thermal Imaging Using a Piezoresistive Microcantilever, Applied Physics Letters vol. 69, (Nov. 1996), pp. 3277–3279.

Paul W. Kruse, *The Design of Uncooled Infrared Imaging Arrays*, Proceedings–SPIE–The International Society for Optical Engineering, Infrared Detectors and Focal Plane Arrays, vol. 2746, Jun. 1996, pp. 34–37.

Charles Marshall, Neal Butler, Richard Blackwell, Robert Murphy, Tom Breen, *Uncooled Infrared Sensor with Digital Focal Plane Array*, Proceedings–SPIE–The International Society for Optical Engineering, Infrared Detectors and Focal Plane Arrays, Jun. 1996, vol. 2746, pp. 23–31.

W. Radford, D. Murphy, M. Ray, S. Propst, A. Kennedy, J. Kojiro, J. Woolaway, K. Soch, et al., *320X240 Silicon Microbolometer Uncooled IRFPAs with On–Chip Offset Correction*, Proceedings–SPIE–The International Society for Optical Engineering, Infrared Detectors and Focal Plane Arrays, vol. 2746, Jun. 1996, pp. 82–92.

J. R. Barnes, R. J. Stephenson, M. E. Welland, Ch. Gerber, J. K. Gimzewski, *Photothermal Spectroscopy with Femtojoule Sensitivity Using an Micromechanical Device*, Nature, vol. 372, Nov. 3, 1994, pp. 79–81, Nature Publishing Group © Macmillan Publishers Ltd. 2000 Registered No. 785998 England.

Minoru Araki, Hideki Koyama, Nobuyoshi Koshide, *Controlled Electroluminescence Spectra of Porous Silicon Diodes with a Vertical Optical Cavity*, Applied Physics Letter, vol. 69, No. 20, Nov. 11, 1996, pp. 2956–2958, Copyright © 1996 American Institute of Physics.

(List continued on next page.)

*Primary Examiner*—Constantine Hannaher
(74) *Attorney, Agent, or Firm*—Lumen Intellectual Property Services, Inc.

(57) ABSTRACT

A bimorph spiral which exhibits a shape-altering response to thermal radiation and is dimensioned to have a focussing effect on light, such as a visible light, by acting as a quasi-Fresnel element. The focussing effect varies as the shape of the bimorph spiral changes due to absorption of thermal radiation. An array of such bimorph spirals can be used for efficient, high-resolution and rapid uncooled photothermal spectroscopy.

19 Claims, 7 Drawing Sheets

OTHER PUBLICATIONS

P. I. Oden, P. G. Datskos, T. Thundat, R. J. Warmack, *Uncooled Thermal Imaging Using a Piezoresistive Microcantilever*, Applied Physics Letter, vol. 69, No. 21, Nov. 18, 1996, pp. 3277–3279, *Copyright © 1996 American Institute of Physics*.

S. R. Manalis, S. C. Minne, C. F. Quate, G. G. Yaralioglu, A. Atalar, *Two Dimensional Micromechanical Bimorph Arrays for Detection of Thermal Radiation*, Applied Physics Letters, vol. 70, No. 24, Jun. 16, 1997, pp. 3311–3313, *Copyright © 1997 American Institute of Physics*.

* cited by examiner

BIMORPH SPIRALS FOR UNCOOLED PHOTOTHERMAL SPECTROSCOPY

RELATED APPLICATIONS

This application claims priority from provisional patent application Ser. No. 60/089,527 filed on Jun. 15, 1998.

This invention was made with Government support under contract N00014-96-1-0071 awarded by the Department of the Navy ONR. The Government has certain rights in this invention.

FIELD OF THE INVENTION

This invention relates generally to thermal sensors for detecting thermal radiation, and in particular to thermal sensors using bimorph spirals for uncooled imaging of thermal radiation.

BACKGROUND AND DESCRIPTION OF PRIOR ART

Recent advances in uncooled detectors for thermal radiation or infrared (IR) radiation have resulted in thermal imaging systems with excellent properties. The most recent systems achieve a sensitivity that approaches the thermal limit and operate at speeds of 60 frames per second. More information about these systems can be found in P.W. Kruse, Proceedings 1996, SPIE Infrared Detectors and Focal Plane Arrays IV (1996), p. 34; C. Marshall et al., Proceedings 1996 SPIE Infrared Detectors and Focal Plane Arrays IV (1996), p. 23; and W. Radford et al. Proceedings 1996 SPIE Infrared Detectors End Focal Plane Arrays IV (1996), p. 82.

In these prior art systems images with high spatial resolution are obtained from arrays containing as many as 400 pixels per $mm^2$ by reading electronic signals generated at each thermal radiation detector. In order to process this information, multiple transistors are integrated into each pixel and a separate device is used to display the image.

The prior art also teaches a direct view system where the thermal radiation is converted to a visible image thus eliminating the need for a complex readout system. Most advanced direct view systems use cantilever bimorph elements which deform in response to thermal radiation. Specifically, a microfabricated bimorph cantilever beam is constructed of two materials that have different coefficients of thermal expansion (CTE). A change in temperature causes the materials to expand or contract by different amounts causing the beam to bend or deform. This deformation can be observed by reflecting visible light, diffracting light from a number cantilevers or by employing any other well-known technique, e.g., from among the ones used in the field of Atomic Force Microscopy. Temperature changes on the order of $10^{-5}$ K. can be detected using bimorph cantilevers for such photothermal spectroscopy. Information about the basic concepts of photothermal spectroscopy using bimorph cantilevers is found in J. K. Gimzewski et al., Chemical Physics Letters, No. 217, 1994, pp. 589.

Further advances in bimorph cantilevers for photothermal spectroscopy are described in publications by J. R. Barnes et al., Nature, No. 372, (1994), pp. 79; P. G. Datskos et al., Applied Physics Letter, Vol. 69, (1996), pp. 2986 and P. I. Oden et al., Uncooled Thermal Imaging Using a Piezoresistive Microcantilever", Applied Physics Letters, Vol. 69, (1996), pp. 3277. These teachings detail how microfabricated cantilevers can be coated with metal to form a bimorph and used for photothermal spectroscopy with a power resolution of 1 $nW/Hz^{-\frac{1}{2}}$. Furthermore, Oden et al. teach that two dimensional arrays of heat sensitive cantilevers can serve as thermal imaging devices. This photothermal technique has proved effective in measuring the power of radiation ranging from ultra-violet (UV) to IR with high sensitivity.

One of the most important parameters relating to thermal sensitivity in cantilever-based photothermal spectroscopy is the length of the beam. In most prior art devices the beam length ranges between 200–400 $\mu$m. When such beams are placed in a two-dimensional array for imaging applications, the density of beams in the direction of the beam is limited to only a few per millimeter. It is possible to obtain a reasonable density of beams in the direction perpendicular to the cantilever. Unfortunately, developing a sensitive detection system for closely spaced sensors is difficult.

OBJECTS AND ADVANTAGES OF THE INVENTION

Accordingly, it is a primary object of the present invention to provide bimorph elements for photothermal spectroscopy which overcome the limitations of cantilever beams. In particular, the bimorph elements of the invention can be arranged in a dense two-dimensional array and yield the same resolution in both directions.

It is a further object of the invention to provide bimorph elements whose deformation can be easily and accurately measured by photometric techniques, thus providing for high measurement sensitivity.

It is yet another object of the invention to ensure that such bimorph elements can be easily manufactured in arrays and to provide an efficient apparatus for detecting and measuring thermal radiation using these bimorph elements.

The above objects and advantages, as well as numerous improvements attained by the apparatus and method of the invention are pointed out below.

SUMMARY

The objects and advantages are secured by a bimorph spiral which exhibits a shape-altering response to thermal radiation. The bimorph spiral is dimensioned to have a focussing effect on a light, such as a visible light. In fact, the bimorph spiral acts almost like a Fresnel element—it is a quasi-Fresnel element—or a Fresnel zone plate with respect to the light. The focussing effect varies as the shape of the bimorph spiral changes due to absorption of thermal radiation.

In order to improve the efficiency of the bimorph spiral it is preferable to add a heat absorbing material to the spiral. In this manner the absorption of the thermal radiation is facilitated. The heat absorbing material can be deposited on a surface of the spiral, e.g., the surface directly exposed to the thermal radiation.

In an apparatus employing an array of bimorph spirals for photothermal spectroscopy it is advantageous to include an electrically conducting material in each bimorph spiral, e.g., the conducting material can be one of the bimorph materials. The conducting material is used to pass a current through the bimorph spiral or to apply a voltage between the bimorph spiral and its support structure. By doing this a bias force $F_b$ can be applied to the bimorph spiral to further improve its efficiency in detecting the thermal radiation.

In one embodiment of an apparatus for photothermal spectroscopy the bimorph spirals are illuminated by light generated by a light source, e.g., a coherent light source such as a laser. The apparatus also has a detector for detecting the light. The detector can be a charge-coupled device (CCD) or any other suitable photodetector. Additional light filtering devices, such as spatial light modulators or aperture plates can be positioned in the path of the light to perform filtering and other optical functions.

During measurement each of the bimorph spirals is exposed to the thermal radiation. Depending on the quantity of radiation absorbed, the spiral changes its shape and hence alters its focussing effect on the light by which it is illuminated. The detector can detect either the light which is transmitted by the bimorph spiral or reflected from it. In measuring reflected light, the detector can also measure light which is reflected from the spiral's support structure and passes through it.

The particulars of the invention and its various embodiments are described in detail in the detailed description section with reference to the attached drawing figures.

DETAILED DESCRIPTION

Figure 1:
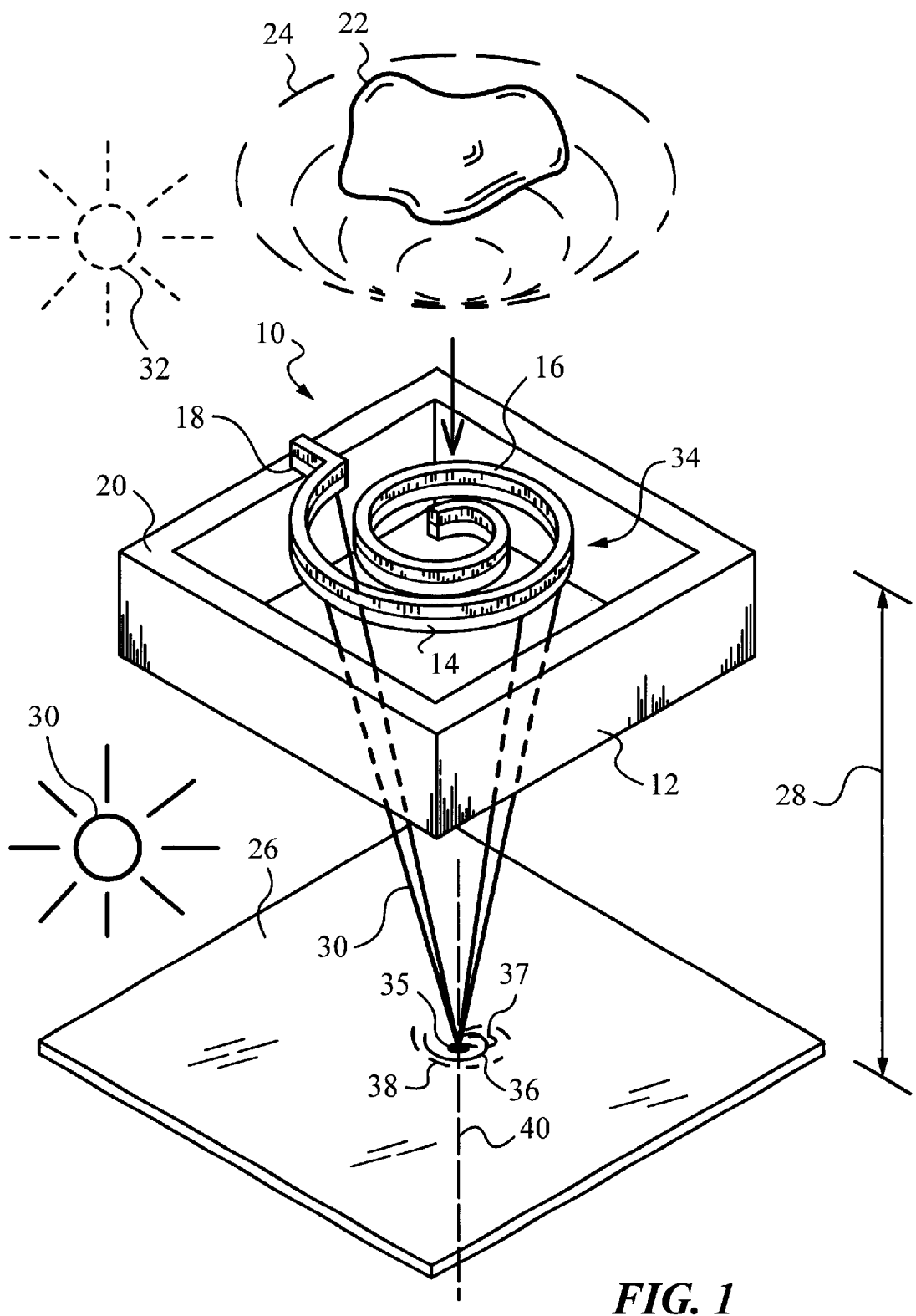
FIG. 1 is an isometric view illustrating the principles of operation of a bimorph spiral according to the invention.

FIG. 1 shows a bimorph spiral 10 mounted in a support structure or frame 12. Spiral 10 is made up of two material layers 14, 16 having different coefficients of thermal expansion (CTE) in accordance with well-known principles of bimorph temperature sensors. Spiral 10 is attached to a top surface 20 of frame 12 by a straight section 18.

An object 22 transmitting thermal radiation 24 is positioned above spiral 10. Thermal radiation 24 can be contained within the IR spectrum or it can occupy any portion of thermal radiation spectrum capable of transmitting heat to spiral 10.

A projection screen 26 is positioned below spiral 10 at a distance 28. Screen 26 is provided for detecting a light 30 passing through spiral 10 or a light 32 reflected from spiral 10. Light 30 and/or light 32 is preferably in the visible range and is preferably supplied by coherent light sources. In addition, light 30 and 32 should preferably illuminate spiral 10 at normal or near-normal incidence. Under these conditions the effect of spiral 10 is most effectively utilized in accordance with the invention. Either light 30 or 32 can be used. For explanation purposes, it is assumed that light 30 reflected from spiral 10 is employed in the measurement of thermal radiation 24, as explained below.

The dimensions of spiral 10 are chosen such that light 30 undergoes diffraction from spiral 10. In other words, the dimensions of spiral 10 are on the order of the wavelength of light 30. Under these circumstances spiral 10 acts like a Fresnel element, and more precisely like a quasi-Fresnel zone plate on light 30.

An actual Fresnel zone plate consists of circular rings. Light reflecting off neighboring rings is focused at a distance along an optical axis of the Fresnel plate. For spiral 10 to be a quasi-Fresnel element, individual coils 34 have to maintain a small pitch. Thus, coils 34 of spiral 10 will closely approximate the action of rings of a Fresnel zone plate.

It is important to first understand the response of spiral 10 when thermal radiation 24 is not absorbed by spiral 10. This occurs, when object 22 is absent, far away or the intensity of thermal radiation 24 is too low to affect or be detected by spiral 10. Under these conditions, when spiral 10 is illuminated by light 30 spiral 10 focuses light 30 at distance 28 along its optical axis 40 on screen 26. In fact, a portion of light 30—approximately 50% of light intensity reflected by spiral 10—is focused at a focal point 35 located in the plane of screen 26. Distance 28 from spiral 10 to focal point 35 is determined by the wavelength of light 30 and the radii of coils 34 in accordance with well-known optics principles. The remaining portion of light 30 reflected by spiral 10 is diffracted into a diffraction pattern 36 drawn in a solid line. Diffraction pattern 36 is not complete since it illustrates only a first order diffraction of light 30 from spiral 10.

In contrast to a circular first order diffraction obtained for an actual Fresnel zone plate, spiral 10 produces a spiral-shaped first order diffraction. A person of average skill in the art will appreciate that calculation of the diffraction pattern of spiral 10 is difficult because spiral 10 lacks the cylindrical symmetry of a Fresnel zone plate. Nonetheless, spiral 10 clearly exhibits a similar focussing effect on reflected light 30 as an actual Fresnel zone plate.

When thermal radiation 24 is absorbed by spiral 10 the shape of spiral 10 is altered due to heating. Specifically, thermally induced stress due to the different CTEs of bimorph material layers 14, 16 causes a bending or deformation of spiral 10. Thus, spiral 10 exhibits a shape-altering response to thermal radiation 24. This shape-alteration degrades the focusing efficiency of spiral 10 and hence reduces the intensity of reflected light 30 at focal point 35. In particular, distortion of spiral 10 shifts the location of focal point 35 along optical axis 40. In addition, because spiral 10 lacks cylindrical symmetry, focal point 35 is also shifted slightly off axis 40 as its distance 28 from spiral 10 along axis 40 changes. Observed on screen 26, the deformation of spiral 10 causes a change as well as a shift in diffraction pattern 36 to a new pattern 38 indicated in dashed lines. Note that spot 37 of pattern 38 is now shifted and larger since it no longer correspond to the focal point of spiral 10.

In accordance with the invention, the amount of deformation of spiral 10, and hence the quantity of thermal radiation 24 absorbed by spiral 10 is monitored by detecting reflected light 30. The monitoring can be performed, e.g., by observing the alteration in the diffraction pattern or by measuring the intensity of reflected light 30 at a fixed point along axis 40, e.g., at original focal point 35 corresponding to undistorted spiral 10.

Figure 2:
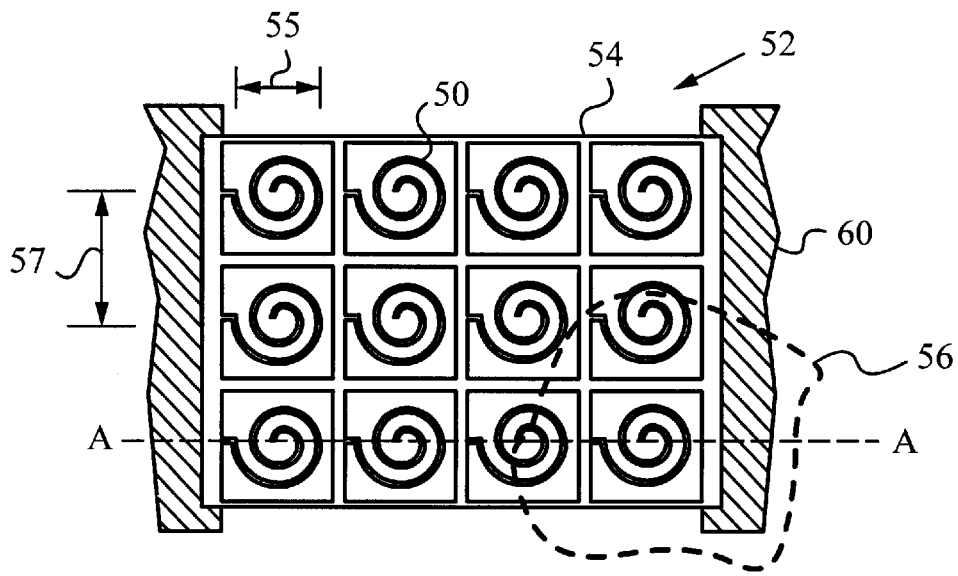
FIG. 2 is a top plan view of an array of bimorph spirals.

In a preferred embodiment shown in FIG. 2 a number of bimorph spirals 50, are mounted together in a rectangular array 52 on a common frame structure 54. Frame structure 54 is supported on a substrate 60. In this embodiment each spiral 50 has a diameter 55 of 30 mm and thus, in undeformed state, acts as a quasi-Fresnel element with a focal length of about 1 mm. Spirals 50 are spaced apart by a separation 57.

Figure 3:
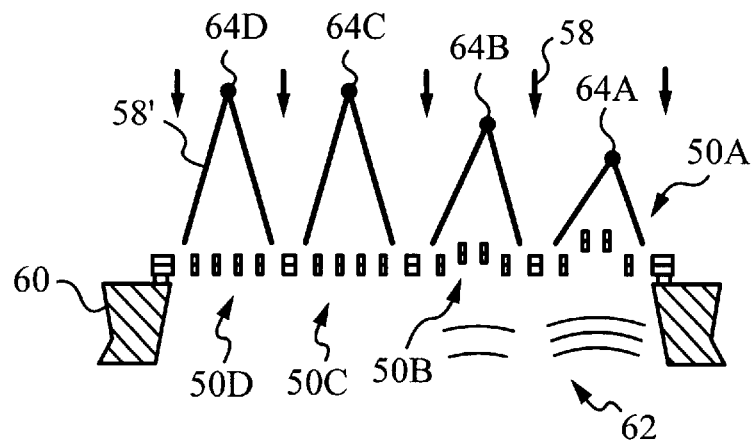
FIG. 3 is a cross sectional view along line A—A of FIG. 2.

An object 56 emitting a thermal radiation 62 is located under array 52 as indicated in dashed lines. As better seen in the cross sectional view of FIG. 3 taken along line A—A a visible light 58 is projected and detected after reflection, indicated by reference 58' from the top of array 52. Light 58 can be generated by any suitable source of coherent light. In this embodiment a 630 nm diode laser (not shown) with an output power of <1 mW is used to illuminated spirals 50. Because of the position of object 56 the intensity of thermal radiation 62 is highest under spiral 50A and lower under spiral 50B. Spirals 50C and 50D do not absorb any thermal radiation. Consequently, spirals 50C, 50D remain undeformed while spiral 50B is deformed by an intermediate amount and spiral 50A undergoes maximum deformation. Correspondingly, a focal point 64A of spiral 50A is shifted by the largest amount, a focal point 64B of spiral 50B is shifted by a smaller amount and focal points 64C, 64D of spirals 50C, 50D remain unchanged. The shifts of focal points 64A and 64B include a change in depth or vertical distance from spirals 50A, 50B and a lateral offset with respect to the optical axes of spirals 50A, 50B.

Figure 4:
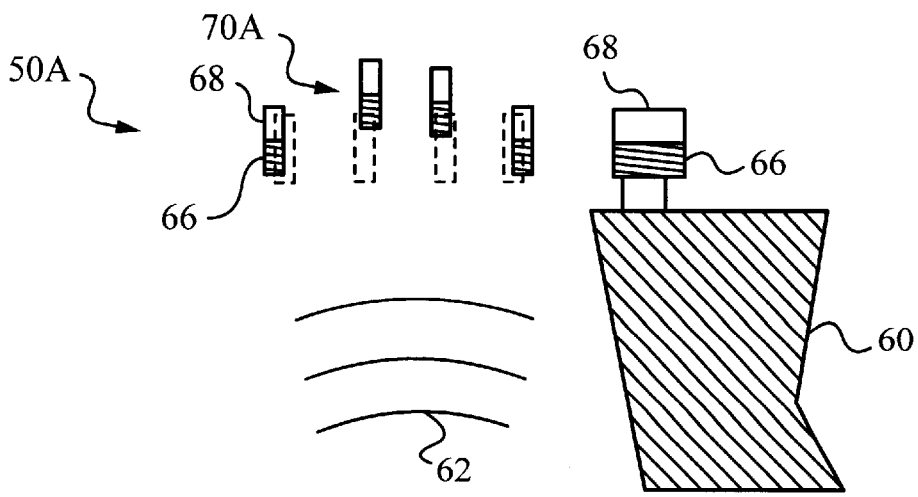
FIG. 4 is an enlarged cross sectional view of a portion of FIG. 3.

The enlarged cross sectional view of FIG. 4 illustrates in more detail the construction of spiral 50A and the shape deformation experienced by it. In this embodiment, all spirals 50, including spiral 50A have two bimorph layers 66, 68. For example, layer 66 is made of silicon or silicon nitride and has a thickness ranging from 1–2 $\mu$m. Layer 68 is a metal layer, e.g., aluminum or any other suitable metal whose CTE is sufficiently different from the CTE of layer 66 to produce a strong bimorph response to thermal radiation 62. Additionally, layer 68 should be relatively thick to further increase the bimorph effect. Absorption of thermal radiation 62 causes deformation of spiral 50A from its original planar position indicated in dashed lines. In addition to a primary deformation of a center coil 70A of spiral 50A out of the spiral's plane, addition lateral deformations may also occur due to non-uniform absorption of thermal radiation 62 and other secondary effects.

Figure 5:
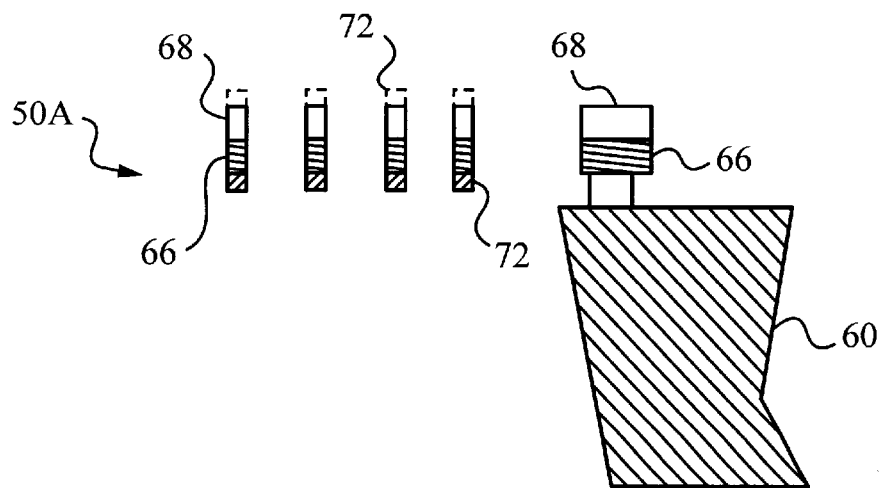
FIG. 5 is an enlarged cross section view of a bimorph spiral provided with a layer of heat absorbing material.

The absorbed power of thermal radiation 62 is usually low, e.g., near 10%, as most of radiation 62 passes through spiral 50A. To maximize the absorption of thermal radiation 62 the underside of spiral 50A exposed to thermal radiation 62 is preferably coated with a thin layer 72 of a heat absorbing material, as shown in undeformed spiral 50A in FIG. 5. Layer 72 facilitates the absorption of thermal radiation 62. Layer 72 is a thin layer of platinum, e.g., about 40 Å. Layer 72 can also be coated on top layer 68 in the event thermal radiation 62 is incident on spiral 50A from above.

Figure 6A:
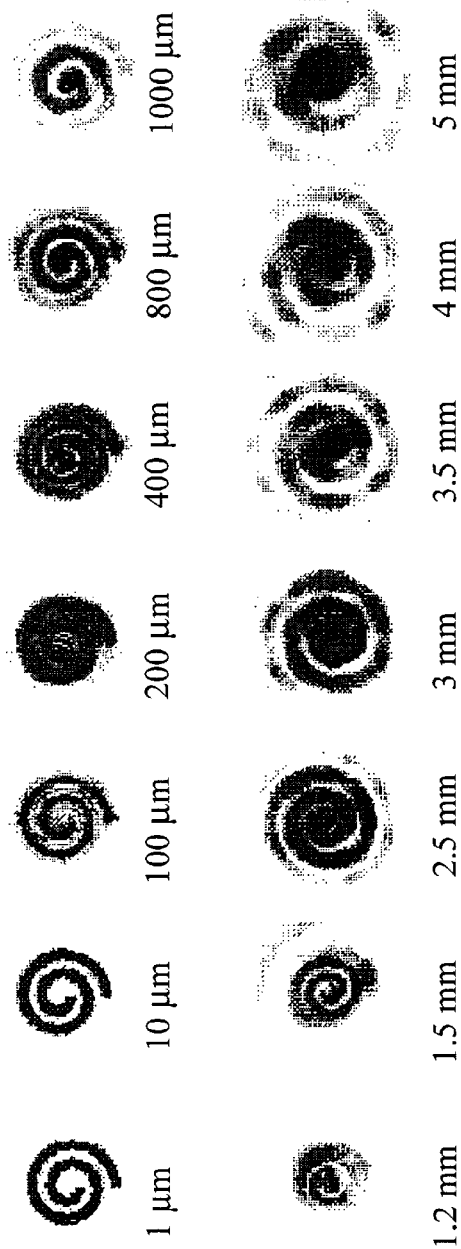
FIGS. 6A–6B are intensity profiles illustrating the diffraction patterns produced by bimorph spirals.

FIG. 6A shows optical intensity profiles at various heights above a bimorph spiral in accordance with the invention illuminated at normal incidence. The geometry of the spiral acts as a lens with a focal length of about 1 mm for a 30 mm spiral. The far-field diffraction pattern is reached at a vertical distance of a few millimeters. Note that each intensity profile is normalized to the maximum intensity achieved at the calculated height.

Figure 7:
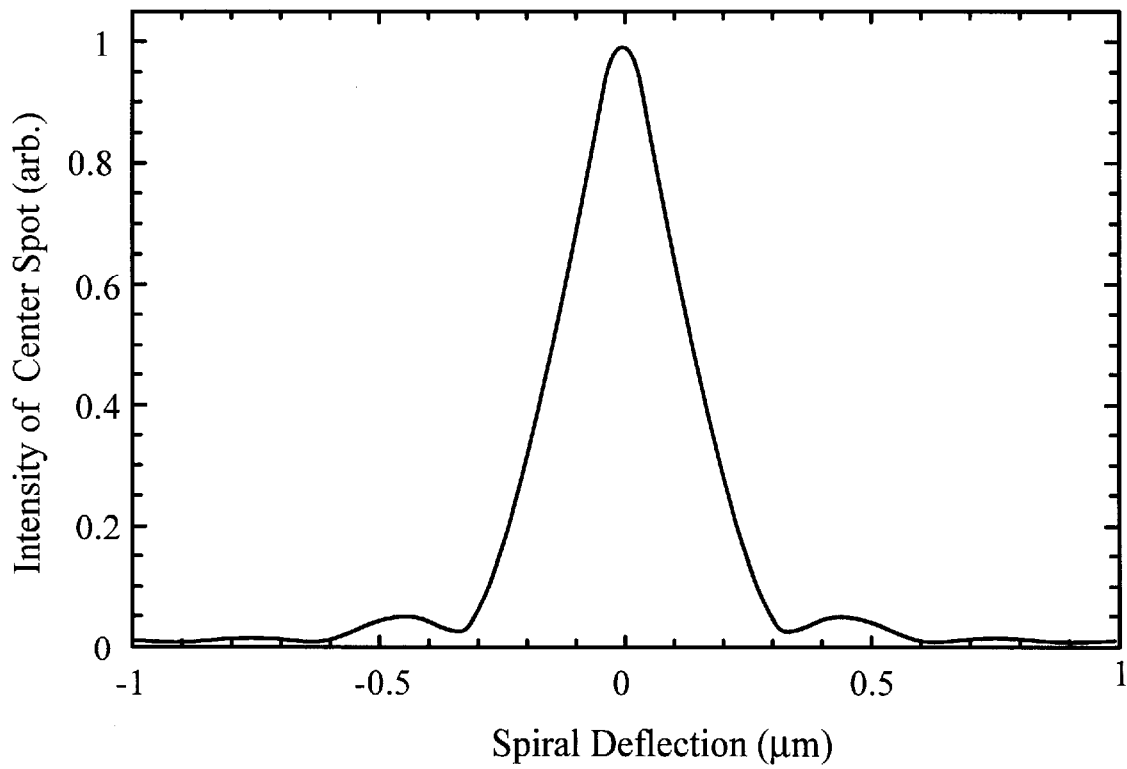
FIG. 7 is a graph of the light intensity at a center spot as a function of spiral deflection.
Figure 6B:
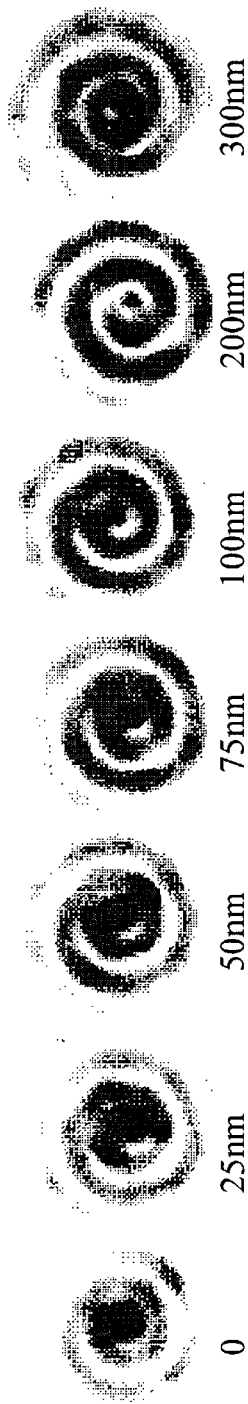

FIG. 6B shows the intensity profile for various deflections of the center of the spiral calculated at a vertical height of 4 mm. For zero deflection the center spot intensity is maximized. At a deflection of 200 nm, the center spot intensity is minimized. This can be observed in more detail in the graph of FIG. 7 where the intensity of the center spot is calculated as a function of spiral deflection. Based on these data the resolution of this photothermal spectroscopy technique is in the sub-angstrom range in a 1 kHz bandwidth. When the thickness of the spiral and top metal layer are optimized, a $10^{-5}$K. change in temperature will deflect the spiral by approximately 0.1 Å.

Figure 8A:
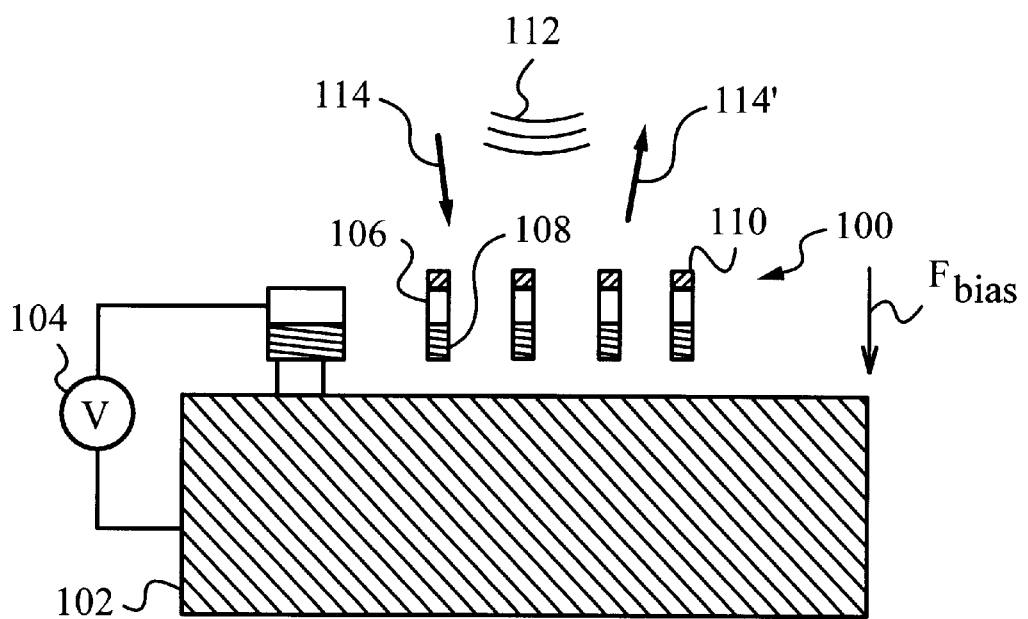
FIGS. 8A–8B are cross sectional schematic views illustrating two arrangements for applying a bias force $F_b$ to a bimorph spiral.

The photothermal spectroscopy technique using bimorph spirals can be further optimized. Specifically, as is apparent from the graph of FIG. 7, the sensitivity of a bimorph spiral from its undeflected position is nearly zero. That is because the rate of change or the first derivative of the intensity of the center spot around zero deflection is zero. A bimorph spiral 100 mounted on a substrate 102 as shown in FIG. 8A solves this problem.

As before, spiral 100 has a bimorph metal layer 106, a bimorph insulator layer 108, and a thin layer 110 of a heat absorbing material. In this embodiment a thermal radiation 112 is incident on spiral 100 from the top and therefore layer 110 is deposited on top of metal layer 106. Deflection or deformation measurement of spiral 100 is performed by illuminating spiral 100 with a coherent light 114 and observing light 114' reflected off substrate 102 and diffracted by spiral 100.

A voltage source 104 is connected between metal layer 106 and substrate 102. During operation, voltage source 104 applies an electric field between metal layer 106 and substrate 102. This electric field produces a bias force $F_b$ on spiral 100. Spiral 100 is thus deflected from its zero deflection and moves away from the low sensitivity range around zero deflection.

Figure 8B:
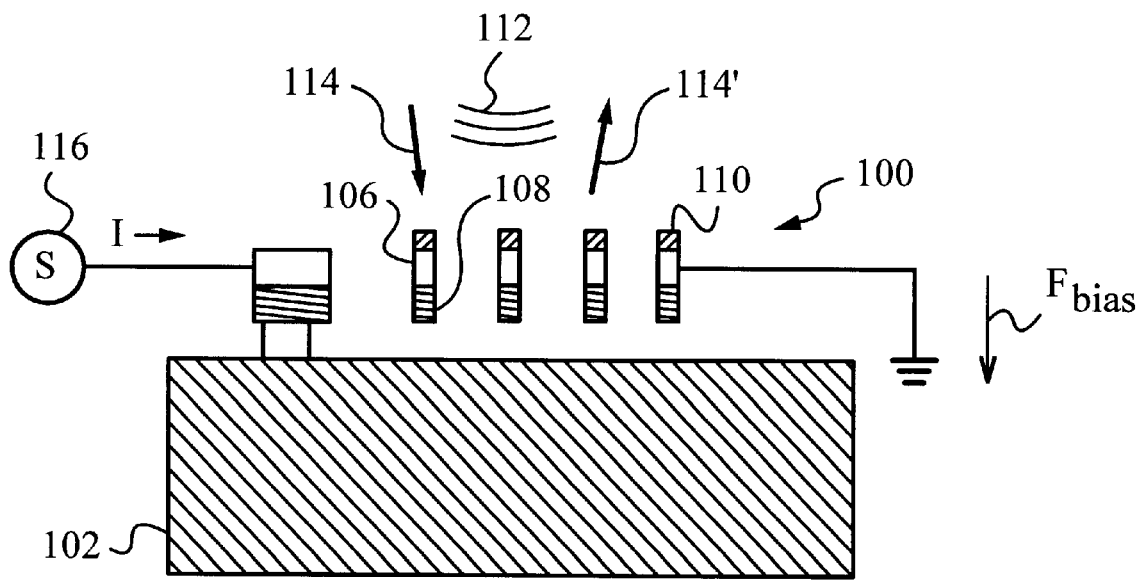

In an alternative embodiment the bias force $F_b$ is applied by pre-heating spiral 100. This approach is illustrated in FIG. 8B, where a source 116 is provided for driving a current I through metal layer 106. Current I heats up spiral 100 and causes it to deflect away from the low sensitivity range around zero deflection.

Sensitivity adjustment can also be achieved by selecting the proper spacing between spiral 100 and substrate 102 as shown in FIGS. 8A–B. In this case no voltage source 104 or current source 116 is required. When the spacing is optimized light 114' reflected from the surface of substrate 102 and from the coils of spiral 100 interfere such that the spiral's sensitivity is maximized at equilibrium. A person of average skill in the art will recognize that various other pre-biasing techniques can be applied to spiral 100 to increase its detection sensitivity around the zero deflection point.

Figure 9A:
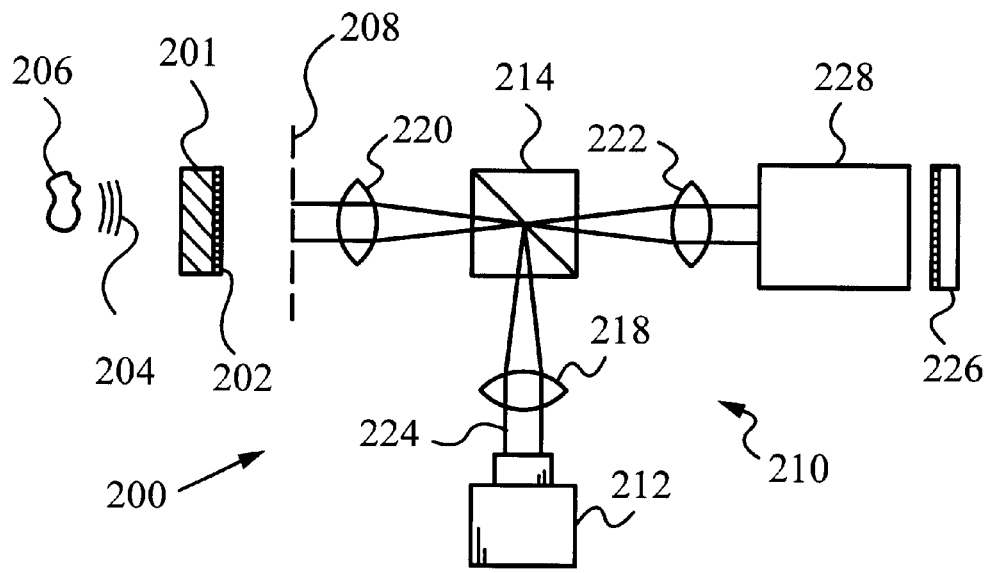
FIGS. 9A–9B are schematic views of two arrangements for performing photothermal spectrometry using an array of bimorph spirals.

FIG. 9A illustrates a system 200 employing an array 201 of bimorph spirals 202 used for detecting thermal radiation 204 emanating from an object 206. A focal plane 208 of spirals 202 in their undeformed positions is imaged with the aid of an optical system 210. Optical system 210 includes an illumination source 212, such as a laser, a beam splitter 214 and lenses 218, 220, 222.

Source 212 provides a light beam 224 which is focussed with the aid of lens 218 and directed to lens 220 by beam splitter 214. Lens 220 collimates beam 224 and directs it at array 201. Spirals 202 reflect beam 224 into diffraction patterns depending on each spiral's deformation as discussed above. The diffraction patterns from focal plane 208 are imaged by lenses 220 and 222 on a CCD camera 226 with the aid of an interposed microscope 228.

For illustration purposes and not as a limitation the performance of array 201 in system 200 uses spirals analogous to spirals 50 with a pitch of 96, 48 and 24 μm and a corresponding spiral arm width of 6, 3 and 1.5 μm. The thickness of the silicon layer is 1.5 μm while the width of the support structure of array 201 is twice that of the spiral arm. The metal layer is made of 200 nm of aluminum and a 40 Å platinum layer for improved thermal absorption is deposited on the metal layer. The density of spirals in array 201 is 400/mm$^2$. In this particular case the temperature resolution and noise equivalent power (NEP) of array 201 is about 50 μK/Hz$^{-\frac{1}{2}}$ at a frequency of 40 Hz. When thermal radiation 204 is in the range of 780 nm and the absorbed power by spirals 202 is about 100 μW per spiral the NEP is about 20 nW/Hz$^{-\frac{1}{2}}$ and the thermal response time is 270 ms. The minimum detectable power is 2 nW/Hz$^{-\frac{1}{2}}$. The NEP value and the thermal response time are thus significantly higher than those achieved by prior art devices.

Figure 9B:
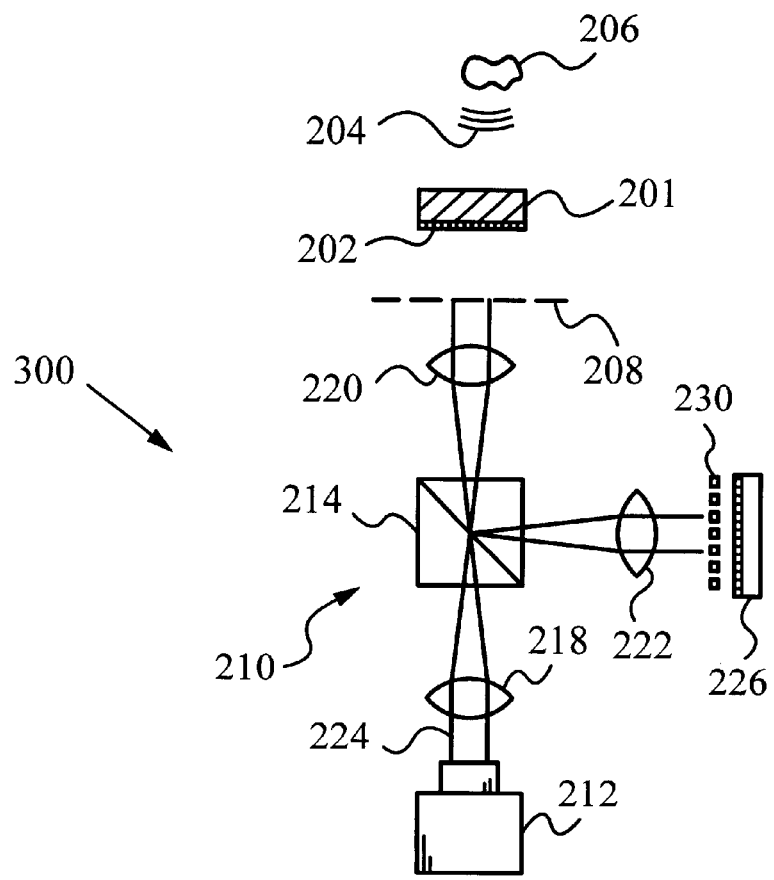
Figure 10A:
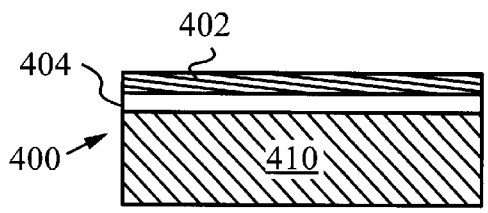
FIGS. 10A–10D are cross sectional views illustrating the manufacturing steps of a bimorph spiral on a solid substrate.
Figure 10B:
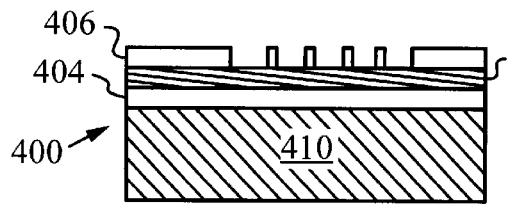
Figure 10C:
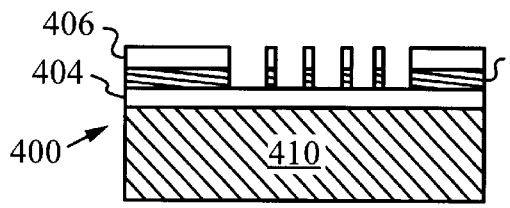
Figure 10D:
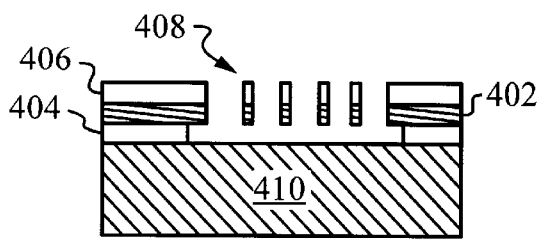

FIG. 9B illustrates another system 300 using array 201 of spirals 202. The same parts are referred to by the same reference numerals. System 300 is arranged to image light 224 from focal plane 208. In this embodiment an array of apertures 230 with a period equal to the spacing between spirals 202 is positioned in front of CCD camera 226. Thus, only the center spot from each spiral is detected. When array 230 is removed, CCD camera 226 will measure the entire diffracted pattern of each spiral. Appropriate software can then be used to discard information from portions of the diffraction patterns away from the central spots. This software can also be used to remove other unwanted optical artifacts, such as any light reflected from the frame or support structure of array 201. Alternatively, well-known spatial filters and other optical devices can be employed by optical system 210 to remove these artifacts from light 224.

A person of average skill in the art will recognize that many different systems can be built to incorporate array 201 of spirals 202. Specifically, systems which measure the diffracted patterns in a mode where light is transmitted through spirals 202 can also be implemented.

Bimorph spirals according to the invention can be fabricated using well-known microfabrication techniques. For example, FIGS. 10A–D show how to fabricate a bimorph spiral starting from with an SOI wafer 400. Wafer 400 has an Si layer 402 deposited on an insulating layer 404, i.e., an oxide layer. In a first step a gold layer 406 is deposited by evaporation or electroless plating to serve as the metal layer. Gold layer 406 is patterned in the form of the desired spiral. In the next step, layer 402 is dry etched. Finally, insulating oxide layer 404 is removed by a wet etching process to produce a spiral 408.

Figure 11A:
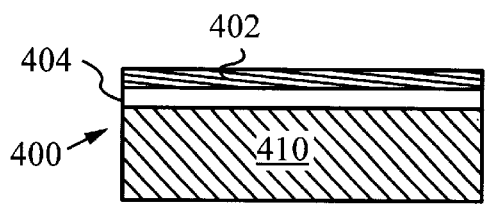
FIGS. 11A–11E are cross sectional views illustrating the manufacturing steps of a bimorph spiral on a substrate having a through hole.
Figure 11B:
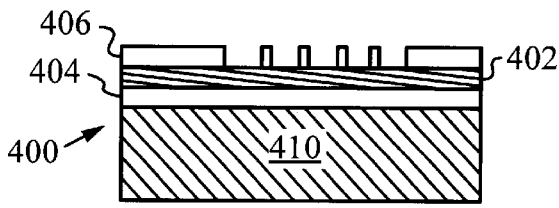
Figure 11C:
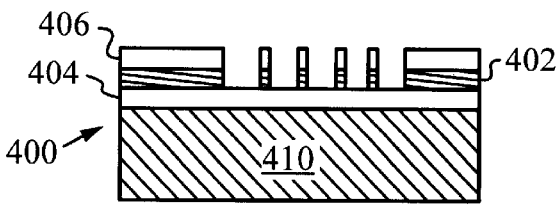
Figure 11D:
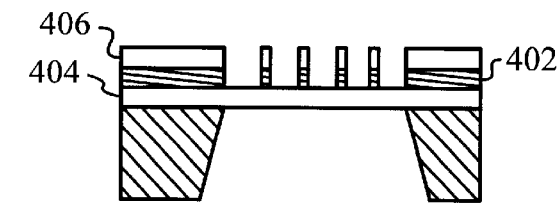
Figure 11E:
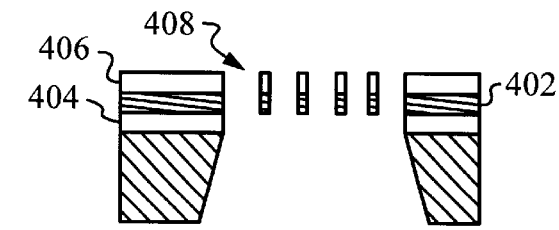

Alternatively, spiral 408 can be processed to be accessible from below. This method is illustrated in FIGS. 11A–E. Once again, wafer 400 is used and the first three steps are analogous to those carried out in FIGS. 10A–C. In FIG. 11D, substrate 410 of wafer 400 is etched in EDP. Then, as shown in FIG. 11E, insulating oxide layer 404 is removed by a wet etching process to produce spiral 408.

Many other alternative embodiments are possible. For example, in one alternative embodiment bimorph spirals can be deposited on membranes, e.g., thermally isolated membranes of silicon nitride. The operation of this embodiment is analogous to those discussed above.

It will be clear to one skilled in the art that the above embodiment may be altered in many ways without departing from the scope of the invention. Accordingly, the scope of the invention should be determined by the following claims and their legal equivalents.

What is claimed is:

1. A bimorph spiral having a shape-altering response to a thermal radiation, said bimorph spiral being dimensioned to have a focussing effect on a light, whereby said focussing effect is changed by said shape-altering response.

2. The bimorph spiral of claim 1, wherein said bimorph spiral is dimensioned to act as a quasi-Fresnel element with respect to said light.

3. The bimorph spiral of claim 1, further comprising a heat absorbing material for facilitating the absorption of said thermal radiation.

4. The bimorph spiral of claim 3, wherein said heat absorbing material is deposited on a surface of said bimorph spiral.

5. The bimorph spiral of claim 1, further comprising an electrically conducting material.

6. An array of bimorph spirals, each of said bimorph spirals having a shape-altering response to a thermal radiation, and each of said bimorph spirals being dimensioned to have a focussing effect on a light, whereby said focussing effect is changed by said shape-altering response.

7. The array of claim 6, wherein said bimorph spirals are dimensioned to act as quasi-Fresnel elements with respect to said light.

8. The array of claim 6, further comprising a heat absorbing material deposited on at least one of said bimorph spirals for facilitating the absorption of said thermal radiation.

9. The array of claim 6, wherein said bimorph spirals comprise an electrically conducting material.

10. An apparatus for photothermal spectroscopy, said apparatus comprising:
   a) a bimorph spiral having a shape-altering response to a thermal radiation, said bimorph spiral being dimensioned to have a focussing effect on a light;
   b) a detector for detecting said light;
whereby said focussing effect is changed by said shape altering response.

11. The apparatus of claim 10, wherein said bimorph spiral is dimensioned to act as quasi-Fresnel element with respect to said light.

12. The apparatus of claim 10, further comprising a means for applying a bias force $F_b$ to said bimorph spiral.

13. The apparatus of claim 10, further comprising a light source for illuminating said bimorph spiral with said light.

14. The apparatus of claim 10, wherein said detector comprises a charge-coupled device.

15. The apparatus of claim 10, further comprising a light filtering means positioned in the path of said light.

16. A method for detecting a thermal radiation comprising the following steps:
   a) providing a bimorph spiral having a shape-altering response to said thermal radiation, said bimorph spiral being dimensioned to have a focussing effect on a light, whereby said focussing effect is changed by said shape altering response;
   b) exposing said bimorph spiral to said thermal radiation;
   c) illuminating said bimorph spiral with a light; and
   d) detecting said light.

17. The method of claim 16, wherein said light is transmitted through said bimorph spiral.

18. The method of claim 16, wherein said light is reflected by said bimorph spiral.

19. The method of claim 16, further comprising the step of applying a bias force $F_b$ to said bimorph spiral.

* * * * *